J. H. Foote,
Dinner Pail.

Nº 76,905. Patented Apr. 21, 1868.

Witnesses
Henry Howard
David G. Overand

Inventor
James H. Foote.
By his attorney,
Sidney Sanders.

United States Patent Office.

JAMES H. FOOTE, OF PITTSFIELD, MASSACHUSETTS.

Letters Patent No. 76,905, dated April 21, 1868.

IMPROVED DINNER-PAIL.

*The Schedule referred to in these Letters Patent and making part of the same.*

TO ALL WHOM IT MAY CONCERN:

Be it known that I, JAMES H. FOOTE, tinner, of Pittsfield, in the county of Berkshire, and State of Massachusetts, have made and invented certain new and useful Improvements in Dinner-Pails; and I do hereby declare that the following is a full, clear, and exact description of the construction and operation of the same, reference being had to the annexed drawings, making a part of this specification, in which—

Figure 1:
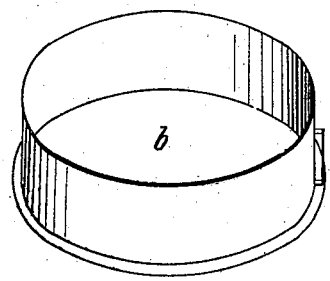

Figure 1 is a perspective view of one of the trays.

Figure 2:
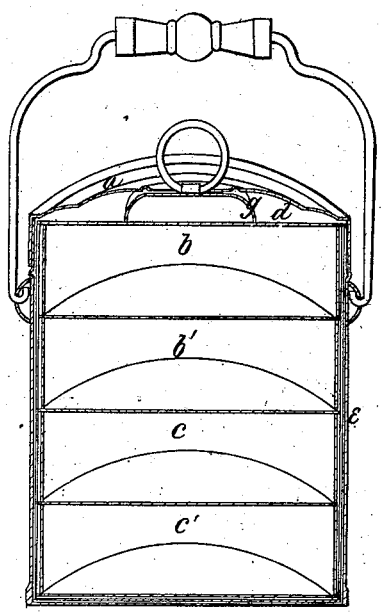

Figure 2, a perspective sectional view of the whole device.

Figure 3:
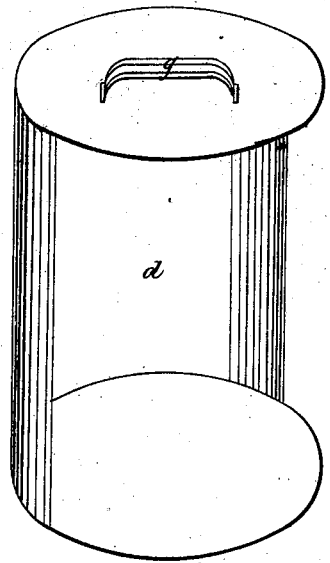

Figure 3, a perspective view of the drawer, and

Figure 4:
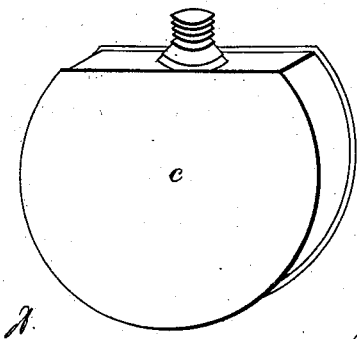

Figure 4 a perspective view of the drink-can.

My invention, which relates to a dinner-pail designed more particularly for laborers, is intended to facilitate the carrying of different kinds of food and drink in the same pail, without danger of mixture or other injury by the oversetting or swinging of the pail.

The novelty of my invention consists in the combination of one or more victual-trays, one or more drink-cans, and a drawer, with an ordinary pail, and over-shutting lid.

In carrying out my invention, I provide a pail, $e$, with a bail, $f$, attached, as in fig. 1, and a lid, $a$, the rim whereof shuts over and around the body of the pail, instead of shutting or sliding into the same, as ordinarily.

I also provide a drawer, $d$, fig. 3, composed of two circular plates, and a curved sheet connecting the same, in such a manner that the whole slides readily into the pail, from which it is withdrawn by a handle, $g$.

I also provide one or more victual-trays, $b\ b'$, so constructed as to sit within the drawer $d$, one above another, and one forming the lid of another, whereby the different kinds of food are kept separate.

I also provide one or more drink-cans, $c\ c'$, fig. 4, the orifices whereof I make water-tight, by corking or other convenient device, the cans being of about the same size as the trays, all of which pack readily within the drawer $d$, whereby they are slid into and withdrawn from the pail $e$, and the top of the drawer $d$ may be made to constitute the lid of the pail $e$, but I prefer a separate lid, $a$.

The advantages resulting from this method of construction and arrangement are, that different kinds of food and drink can be carried in independent compartments of the same pail without damage or injury; that the drawer, cans, and trays can be removed, and an ordinary pail left for use, if desired; and that, if exposed to rain, as is often the case with laborers, the over-shutting lid prevents the penetration of the water to the victuals.

Having thus described the nature and construction of my invention, what I claim as new, and for which I desire to secure by Letters Patent, is—

1. One or more trays, $b\ b'$, in combination with the drawer $d$ and pail $e$, as and for the purpose specified.

2. One or more drink-cans, $c\ c'$, in combination with the drawer $d$ and pail $e$, as and for the purpose specified.

3. The drawer $d$, in combination with one or more trays, $b\ b'$, one or more cans, $c\ c'$, and the pail $e$, as and for the purpose specified.

J. H. FOOTE.

Witnesses:
 LORENZO H. GAMNELL,
 G. W. ROOT.